United States Patent [19]

Dischert

[11] 4,396,938
[45] Aug. 2, 1983

[54] CONTROLLED RAM SIGNAL PROCESSOR

[75] Inventor: Robert A. Dischert, Burlington, N.J.

[73] Assignee: RCA Corporation, New York, N.Y.

[21] Appl. No.: 286,264

[22] Filed: Jul. 23, 1981

[51] Int. Cl.³ .............................................. H04N 5/14
[52] U.S. Cl. .................................. 358/21 R; 358/160; 364/737
[58] Field of Search ................... 358/21 R, 27, 29, 32, 358/33, 34, 35, 36, 37, 38, 41, 160, 163, 167, 171, 174; 364/514, 515, 724, 737

[56] References Cited

U.S. PATENT DOCUMENTS

| | | | |
|---|---|---|---|
| 4,146,931 | 3/1979 | Delforge | 364/724 |
| 4,148,070 | 4/1979 | Taylor | 358/160 |
| 4,163,249 | 7/1979 | Michael | 358/21 R |
| 4,212,072 | 7/1980 | Huelsman et al. | 364/515 |
| 4,222,076 | 9/1980 | Knowlton | 364/515 |
| 4,240,106 | 12/1980 | Michael et al. | 358/36 |
| 4,240,113 | 12/1980 | Michael et al. | 358/180 |
| 4,242,704 | 12/1980 | Ito et al. | 358/167 |
| 4,270,145 | 5/1981 | Farina | 358/27 |
| 4,309,772 | 1/1982 | Kloker | 364/724 |
| 4,340,903 | 7/1982 | Tamura | 358/29 |
| 4,346,405 | 8/1982 | Yoda | 358/160 |

FOREIGN PATENT DOCUMENTS 2015847 9/1979 United Kingdom .

Primary Examiner—Michael A. Masinick
Attorney, Agent, or Firm—E. M. Whitacre; W. H. Meise; H. I. Steckler

[57] ABSTRACT

A digital signal processor uses a RAM for signal processing. This allows the transfer function to be easily changed by either hardwired circuitry or a microprocessor. Two RAMs per channel can be used, one processing the signal, while the other has its transfer function changed. The operations of the RAMs can be changed during a portion of the input signal, e.g. blanking times, when the switch over is not objectionable.

19 Claims, 4 Drawing Figures

CONTROLLED RAM SIGNAL PROCESSOR

BACKGROUND OF THE INVENTION

The present invention relates to a high-speed digital signal processor and more particularly of the type of processor utilizing a look-up table to generate the output signal from an input signal such as a video signal.

In the prior art, it is known to use a read-only memory (ROM) for processing digital signals at high speed. As illustrated in FIG. 1, digital signals, such as a video signal, are applied in parallel to 8-bit input terminal 10, and from there to the 8-bit address input 12 of ROM 14. The digital video signals may come for example from an A/D converter (not shown) operated at a clock rate. The input of the converter would have an analog video signal applied to it so that the input video signal is sampled and then 8-bit quantized (256 grey levels) at the clock rate. The clock which drives the ADC (not shown) is also applied to the read input 16 of ROM 14. For each possible signal value applied to the ROM address, there is a corresponding ROM memory location which contains data which may be read from 8-bit output 18 on to an 8-bit output terminal 20. Typically, line 20 will be 8-bits wide for television applications, but may have other values. Thus, depending upon the data stored in the ROM, the signal may be processed. For example, if the data stored in each ROM address is a value representative of half the address value, the data read out will represent one-half of the input, and therefore ROM 14 functions as a 2:1 attenuator. Other amplitude functions are possible. For example, in order to provide limiting, each memory location may have, as before, stored data representing half the address for the memory location. However, memory in the addresses above a particular value may all contain stored data representing half the address of the limiting value.

This will give a linear gain of one-half up to the limiting value and no increase after that value. In a similar manner, pedestal functions may be generating by having at each memory address data representing the address value summed with a fixed offset value. Gamma correction can be accomplished by setting the data stored in each memory location in accordance with a predetermined exponential gamma function such as a square-root function.

The described prior art system has the disadvantage that the transfer function is fixed by the ROM memory. If such a ROM were used for example to control the gain, pedestal and gamma of one of three color representative signals derived from a vidicon, analog controls would have to precede the ADC so as to standardize the signal levels entering the ROM for further processing. In the absence of such a standardization, the ROM could not be used because the transfer function could not be changed to meet varying conditions. It would be possible, of course, to change the ROM as described in U.S. patent application filed July 17, 1980, Ser. No. 169,680, for Terence Smith and Frank Marlowe and entitled "SYNCHRONIZING CIRCUIT ADAPTABLE FOR VARIOUS TV STANDARDS". While this allows changing ROMs when a different use is intended, it does not solve the problem of variations encountered during use.

It is therefore desirable to have a signal processor that can change its transfer function during use.

SUMMARY OF THE INVENTION

Method and apparatus for signal processing comprising at least a first high-speed RAM having addresses and producing at output terminals data representative of the contents of the accessed address selected by the incoming signal; a source of control signals; means for obtaining from said control signals appropriate new look-up values according to a predetermined algorithm; and means for loading said RAM with said new look-up values.

DETAILED DESCRIPTION

Figure 1:
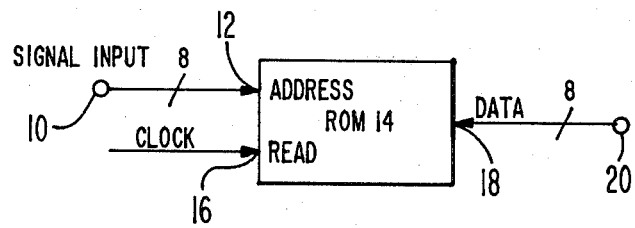
FIG. 1 shows a typical prior art signal processor using a ROM.
Figure 2:
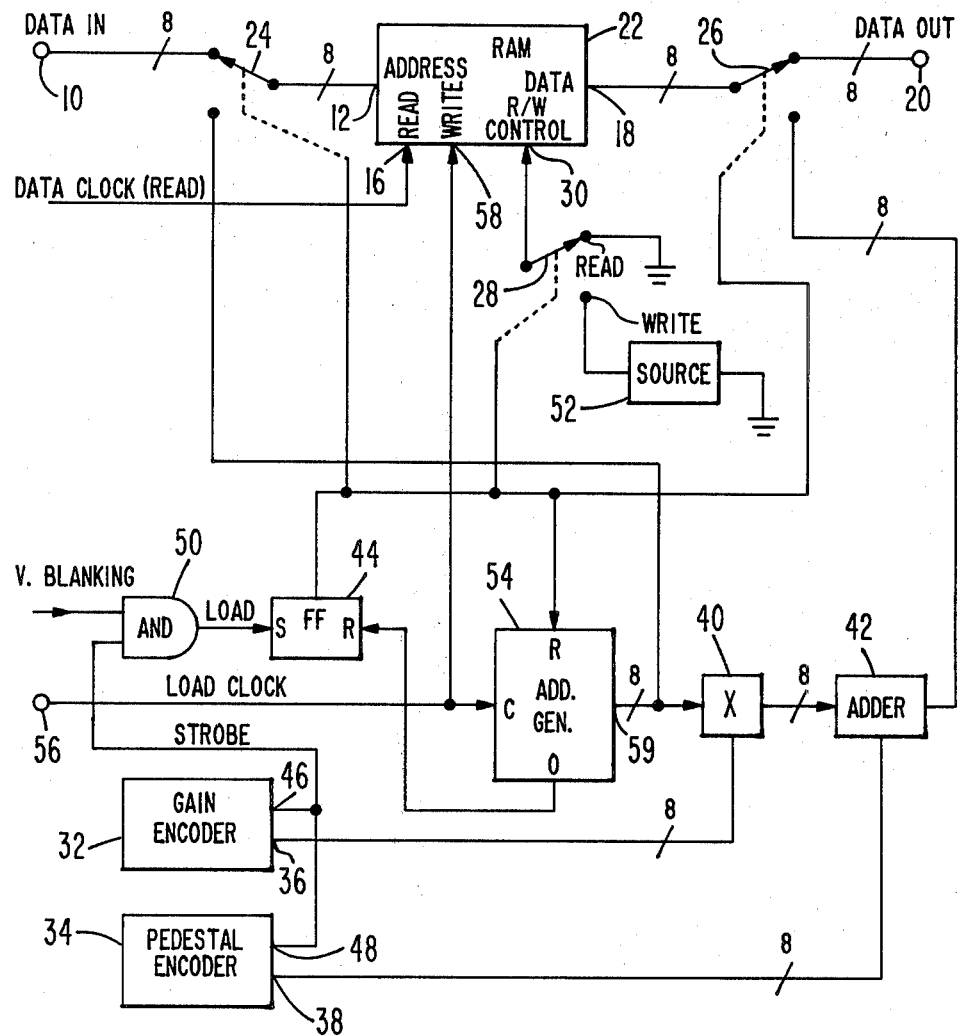
FIG. 2 shows a RAM hardwired processor in accordance with a first embodiment of the invention.

FIG. 2 shows a hardwired embodiment of the invention for use in one channel of a television camera where in general, ROM 14 of FIG. 1 has been replaced by RAM (random access memory) 22 to allow control of the transfer function between input 10 and output 20 during use. During normal operation, switches 24, 26 and 28 are in their upper position as shown in FIG. 2, since flip-flop 44, which controls said switches 24, 26 and 28 as indicated by dotted lines, is in its reset position. Although shown as mechanical switches, it will be appreciated that switches 24, 26 and 28 are electronic switches in the preferred embodiment. Thus, the 8-bit digital video signal from a camera tube and A/D converter (not shown) applied at input 10 is applied to 8-bit switch 24 (8 poles, one for each bit) and from there to address input 12 of RAM 22. As with ROM 14, the data clock signal is applied to read clock input 16. Read/write control input 30 is grounded by switch 28, thus placing RAM 22 in the read mode. For each possible value of input signal applied as an address to RAM 22, there is a corresponding RAM memory location which contains data in accordance with the previously stored transfer function. The data stored in the memory location at the address corresponding to the value of the video signal applied to input terminal 10 is read from the output 18 at each clock pulse. The data thus read from memory 22 passes through 8-bit switch 26 to output terminal 20. So long as the contents of RAM 22 are not changed, it operates precisely as does ROM 14 of FIG. 1, providing high-speed amplitude change according to the programmed function.

Assuming that the pedestal or gain function of the camera tube of a particular channel changes, it may be desirable to change the programming, i.e., the transfer function of RAM 22. These changes will ordinarily become apparent while the camera is in use. The user does not have facilities for analyzing the transfer function and reprogramming the RAM. Consequently, the camera as sold to the user must provide some means for adjustment of the transfer function. Ideally, the means provided will have user controls which perform in the same manner as the analog pedestal or gain functions with which the user is familiar. According to the invention, the changes are initiated by entering new gain or pedestal values on gain and pedestal digital shaft encoders 32 and 34 respectively. The new gain or pedestal values are present at 8-bit outputs 36 and 38 respectively and are applied to 8-bit inputs of 8-bit multiplier 40 and 8-bit adder 42 respectively. Strobe outputs 46 and 48 provide a strobe signal indicating that encoder 32 or 34 respectively have been actuated, and the strobe signal is applied to one input of AND gate 50. The other input of gate 50 receives a vertical blanking signal from synchronization circuits (not shown) present in the camera. The output of gate 50 provides a load command signal, which occurs only during the vertical blanking interval to avoid possible disturbances in the displayed picture due to transfer function changes during the occurrence of active video. If desired, the load signal can be made to occur during several horizontal blanking intervals.

The load signal from gate 50 is applied to set input S of flip-flop 44, which flip-flop 44 now provides an output signal that controls switches 24, 26 and 28 to be in their down position. Source 52 applies a voltage through switch 28 to read/write input 30 to place RAM 22 into the write mode. Flip-flop 44 when set, also applies its output signal to reset input R of address generator 54, and thus generator 54 is reset to zero.

A load clock pulse signal is received at input 56 from a load clock generator, not shown, and is applied to write clock input 58 of RAM 22 and to clock input C of address generator 54. Output 59 of address generator 54 sequentially provides at the load clock rate binary address signals representing the decimal numbers 0 to 255, which address signals are applied through switch 24 to address input 12 of RAM 22. The load clock generator rate is selected to allow generator 54 to generate 255 addresses during the vertical blanking interval. The address signals are also applied to multiplier 40, where they are multiplied by the gain determined by gain encoder 32. The resulting product output signal is applied to adder 42. For example, if the gain is one, then the addresses from generator 54 are applied to adder 42, while if the gain is one half, then signals representing one half the value of the address are so provided. Adder 42 adds a pedestal (D.C. offset) as determined by encoder 34 to the product signal, and the resulting sum signal is provided through switch 26 to output 18, which now functions as a data input.

When generator 54 provides a signal at output 58 corresponding to decimal 255, overflow output 0 of generator 54 provides a high output signal to reset input R of flip-flop 44 that indicates that the writing into RAM 22 has been completed. Flip-flop 44 is now reset, and therefore switches 24, 26 and 28 are again in their up position, as shown in FIG. 2. Read/write control input 30 is again grounded, thus placing RAM 22 in the read mode. Therefore, signals coming in at input 10 can now be applied to RAM 22 through switch 24 and processed therein in accordance with the new gain and pedestal transfer functions and an output signal provided to output 20 through switch 26.

Figure 3:
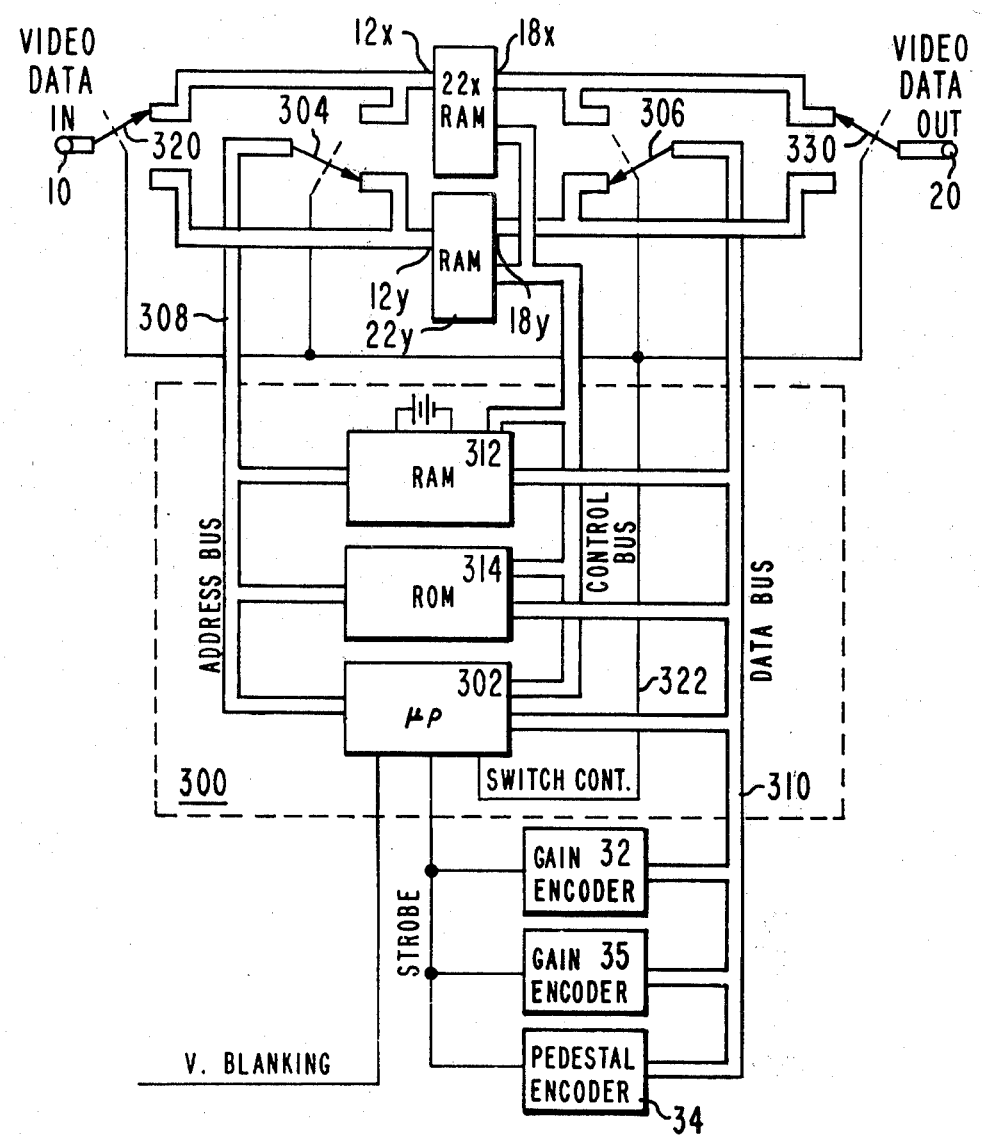
FIG. 3 shows a microprocessor controlled second embodiment.

FIG. 3 shows a microprocessor-controlled second embodiment of the invention where corresponding elements have been given corresponding reference numerals. As shown therein, RAM 22 of FIG. 2 has been replaced by two RAMs 22x and 22y. This enables one RAM to process the video signal, while the other RAM can have its transfer function changed during the active video portion of the scanning raster without causing disturbances in the viewed scene. For example in the positions shown in FIG. 3, switch 320 routes the video data at terminal 10 to address input 12x of RAM 22x and switch 330 connects data output 18x to video data output 20. Thus, RAM 12x processes the video signal in accordance with the transfer function therein. Block 300 is controlled by microprocessor 302 and is coupled to the address and data 8-bit switches 304 and 306 respectively by address buss 308 and data buss 310 respectively. Block 300 receives input signals from 8-bit data buss 310 which may be generated by any signal source. As illustrated, the signal sources are gain, gamma, and pedestal, encoders 32, 35 and 34 respectively. Other sources such as thumb-wheel switches or potentiometers with analog-to-digital converters coupled to their respective outputs could be used. ROM 314 of block 300 includes the one fixed preprogrammed item in the entire arrangement. That fixed item is the equation representing the factors affecting the transfer function. For example, if the functions of gain, pedestal and gamma are to be provided, it is important to know whether the pedestal is to be applied before or after the gamma correction. If the function of the block is to correct for errors generated by the camera tube, the pedestal addition should precede the gamma corrections. On the other hand, if the pedestal addition is to compensate for later-occurring clamp offsets, the gamma correction should precede the pedestal addition. ROM 314 also contains a set of instructions for carrying out the calculation.

Block 300 also includes a nonvolatile memory which may be, for example, a RAM 312 with battery operation. RAM 312 stores the present value of the various parameters being processed. In a particular example, the nonvolatile memory may include the number 0.5 representing the present value of the gain, a value of pedestal which may for example presently be zero, a value of gamma, which may be 0.5. A turn-on, microprocessor 302 calculates for the first common address value of RAMs 22x and 22y the transfer function value that will be stored in that particular address. Microprocessor 302 in order to make this calculation utilizes the three values stored in nonvolatile memory 312, using an appropriate equation stored in ROM 314 in accordance with whether gamma correction precedes or succeeds pedestal addition. Having accomplished the calculation, the calculated number is stored in RAM 22y assuming switches 304 and 306 are in the positions shown in FIG. 3. Microprocessor 302 then proceeds to the second address, again performs the calculation and stores the result in RAM 22y. Microprocessor 302 continues to step through the addresses and for each step performs calculations giving the desired transfer function.

At the end of the calculation interval, switches 304, 306, 320, and 330 are switched during the next vertical interval by microprocessor 302 acting through switch control line 322 to be in positions opposite that shown in FIG. 3. Thus, the video data at input 10 is applied by switch 320 to address input 12y of RAM 22y and switch 330 connects data output 18y to output terminal 20. Hence, RAM 22y now processes the video signal in accordance with the new transfer function stored therein. Switches 304 and 306 connect address and data busses 308 and 310 respectively to input 12x and output 18x respectively. Thus, when it is next desired to change gain, gamma, or pedestal functions, the new values are stored in RAM 22x. During the next vertical interval, switches 320, 304, 306 and 330 are switched into the positions shown in FIG. 3, and hence RAM 22x once again processes the video signal.

In systems where interruptions in the video signal are tolerable, such as pre-air time set-up adjustments, it is possible to use only one of RAMs 22x and 22y. In such systems the video output signal would be switched off while loading of the RAM occurs.

Figure 4:
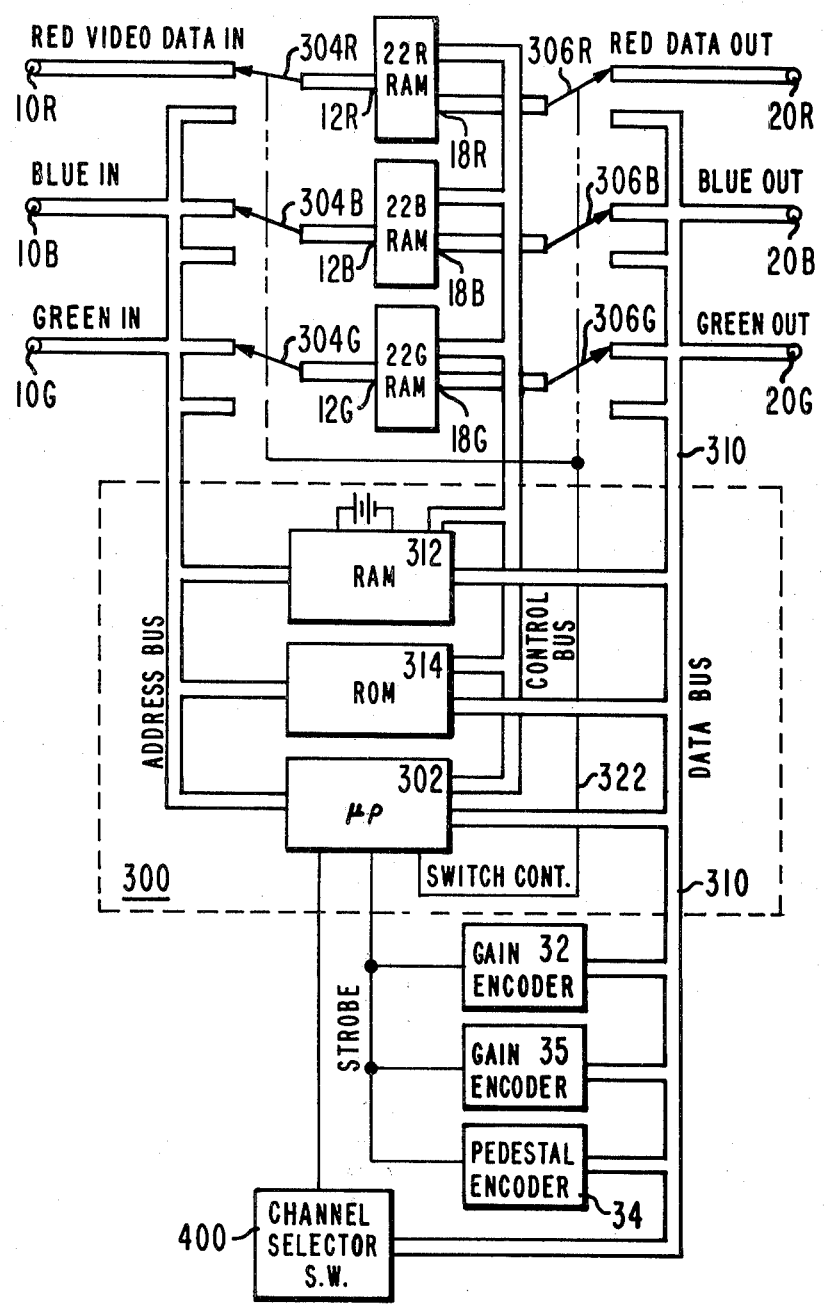
FIG. 4 shows a plural channel embodiment.

FIG. 4 shows a plural channel third embodiment of the invention which uses the above concept, wherein corresponding reference numerals are used with corresponding elements and the letters R, G, B are added to the numerals to indicate elements in the red, green and blue channels. As shown in FIG. 4, a channel selector encoder 400 determines which channel is having the transfer coefficient of its particular RAM 22R, 22G, or 22B changed. Then microprocessor 302 address only that particular RAM to provide the change in transfer function. If it is desired that all channels have the same transfer function, all RAMs would be addressed for loading at the same time. Further two RAMs per channel can be used as in the single channel embodiment of FIG. 3. Still further, the new coefficients can be loaded into RAM 312 as they are being calculated. After the calculation is complete, during the next occurring vertical interval the new coefficients are rapidly transferred from RAM 312 to at least one of RAMs 22R, 22B, and 22G. This makes the video signal discontinuity short, and it occurs only during the vertical interval. To reduce even this short discontinuity, a blanking signal can be connected to at least one of outputs 20G, 20B and 20R during the occurrence of the discontinuity. For some applications, this procedure eliminates the need for two RAMs per channel.

It will be appreciated that many other embodiments are possible within spirit and scope of the invention. For example, if encoders 32, 34 and 35 contain memory, then RAM 312 can be a volatile type.

Further, if the calculation for the new look-up value is unduly complicated, and not many calculations are required, then these calculations can be done beforehand and stored in ROM 314. At the appropriate time the look-up data can be transferred to RAMs 22x or 22y. Still further partial calculations may be done beforehand with additional calculations done just before said transfer.

As used in this description and claims, "RAM" means a random access read-write memory. Further "high speed" means the RAM can operate at the signal data rate.

What is claimed is:

1. A digital look-up table signal processing system comprising:
    a first high-speed RAM having addresses and producing at output terminals data representative of the contents of the accessed address selected by an incoming signal in accordance with a composite transfer function;
    a plurality of sources of control signals for determining components of said composite transfer function;
    means for obtaining from said control signals appropriate new contents for said addresses according to a predetermined algorithm; and
    means for loading said RAM with said new contents.

2. A system as claimed in claim 1, further comprising a second RAM, means for switching said incoming signal between said RAMs, and wherein said means for loading loads only that one of said RAMs not processing said incoming signal.

3. A system as claimed in claim 1, further comprising second and third RAMs, each of said RAMs coupled in a signal processing channel respectively, all RAMs being loaded by said means for loading.

4. A system as claimed in claim 3, wherein said channels comprise signals representing red, green and blue color component signals of a television signal.

5. A system as claimed in claim 1, wherein said sources of control signals each comprises a digital shaft encoder.

6. A system as claimed in claim 1, wherein said sources of control signals controls at least one of gain, pedestal, and gamma functions.

7. A system as claimed in claim 1, wherein said means for obtaining comprises a means for calculating said new contents.

8. A system as claimed in claim 7, wherein said means for calculating comprises circuitry coupled together in accordance with said algorithm.

9. A system as claimed in claim 7, wherein said means for calculating comprises a ROM means for storing said algorithm and a microprocessor coupled to said ROM means.

10. A system as claimed in claim 8, wherein said means for loading comprises an address generator having an input means for receiving a load clock and an output coupled to said RAM.

11. A system as claimed in claim 1, wherein said means for loading comprises a microprocessor coupled to said RAM.

12. A system as claimed in claims 10 or 11, wherein said means for loading comprises means for ensuring loading of said RAM only during a blanking interval of the incoming signal.

13. A system as claimed in claim 1, wherein said means for obtaining comprises means for storing at least a portion of said new contents.

14. A digital look-up table signal processing system comprising:
    first and second high-speed RAMs each having addresses and producing at output terminals data representative of the contents of the accessed address selected for an incoming signal;
    means for switching said incoming signal between said RAMs;
    a source of control signals;
    means for obtaining from said control signals appropriate new contents for said addresses according to a predetermined algorithm; and
    means for loading that one of said RAMs not processing said incoming signal with said new contents.

15. A digital look-up table signal processing system comprising:
    first, second and third high-speed RAMs, each of said RAMs coupled in a signal processing channel respectively and having addresses and producing at output terminals data representative of the contents of the accessed address selected by incoming signals;
    a source of control signals;
    means for obtaining from said control signals appropriate new contents for said addresses according to a predetermined algorithm; and
    means for loading all of said RAMs with said new contents.

16. A digital look-up table signal processing system comprising:
    a first high-speed RAM having addresses and producing at output terminals data representative of the contents of the accessed address selected by an incoming signal;

a source of control signals for controlling at least one of gain, pedestal, and gamma functions;

means for obtaining from said control signals appropriate new contents for said addresses according to a predetermined algorithm; and means for loading said RAM with said new contents.

17. A digital look-up table signal processing system comprising:

a first high-speed RAM having addresses and producing at output terminals data representative of the contents of the accessed address selected by an incoming digital video signal having a blanking interval;

a source of control signals;

means for obtaining from said control signals appropriate new contents for said addresses according to a predetermined algorithm; and means for loading said RAM wiith said new contents only during a blanking interval.

18. A digital video signal translating system comprising:

a digital video signal path including a random access memory operable in first and second modes, and having address inputs responsive to an input digital video signal, and outputs for reproducing stored digital signals representative of said input digital video signal modified by a given transfer function when said memory is operated in said first mode, and operable in said second mode for loading applied digital signals into said memory;

means for generating a control signal representative of the desired transfer function of said signal path;

means responsive to said control signal for generating a table of digital signals for said random access memory;

means, coupled to said generating means, for storing said table of digital signals; and means, coupled between said storing means and said random access memory, for loading said table of digital signals into said random access memory during a vertical retrace interval of said digital video signal.

19. A digital video signal translation system comprising:

a plurality of video signal paths, each including a random access memory operable in first and second modes, and having address inputs responsive to a respective input digital video signal, and signal outputs for reproducing data words stored in addressed memory locations, said data words being representative of said respective input digital video signal modified by a given transfer function, when said memory is operated in said first mode, and operable in said second mode for loading applied digital data words into said memory locations;

means for generating a control signal representative of the desired transfer function of a selected one of said digital video signal paths;

means responsive to said control signal for generating a table of digital data words;

means, coupled to said generating means, for storing said table of digital data words;

a data bus coupled between said storing means and said random access memories; and means for controllably loading said stored table of digital data words into said memory locations of said random access memory of said selected video signal path when said random access memory of said selected path is operating in said second mode.

* * * * *

Disclaimer 4,396,938.—*Robert A. Dischert*, Burlington, N.J. CONTROLLED RAM SIGNAL PROCESSOR. Patent dated Aug. 2, 1983. Disclaimer filed Jan. 17, 1985, by the assignee, *RCA Corp.*

Hereby enters this disclaimer to claims 16 and 17 of said patent.
[*Official Gazette April 9, 1985.*]